United States Patent
Belghoul et al.

(10) Patent No.: US 10,721,792 B2
(45) Date of Patent: Jul. 21, 2020

(54) USER EQUIPMENT AND NETWORK PROCEDURES FOR EMERGENCY BROADCASTING ON WI-FI

(71) Applicant: Apple Inc., Cupertino, CA (US)

(72) Inventors: Farouk Belghoul, Campbell, CA (US); Krisztian Kiss, Hayward, CA (US); Rafael L. Rivera-Barreto, Santa Clara, CA (US); Rohan C. Malthankar, San Jose, CA (US); Sherman X. Jin, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/405,242

(22) Filed: May 7, 2019

(65) Prior Publication Data

US 2019/0350044 A1 Nov. 14, 2019

Related U.S. Application Data

(60) Provisional application No. 62/670,560, filed on May 11, 2018.

(51) Int. Cl.
*H04M 11/04* (2006.01)
*H04W 76/50* (2018.01)
(Continued)

(52) U.S. Cl.
CPC ......... *H04W 76/50* (2018.02); *H04L 65/1006* (2013.01); *H04L 65/1016* (2013.01); *H04W 4/021* (2013.01); *H04W 4/90* (2018.02); *H04W 8/08* (2013.01); *H04W 60/00* (2013.01); *H04W 76/25* (2018.02); *H04W 80/10* (2013.01);
(Continued)

(58) Field of Classification Search
None
See application file for complete search history.

(56) References Cited

U.S. PATENT DOCUMENTS 7,221,928 B2  5/2007  Laird
8,682,279 B2  3/2014  Rudolf
(Continued)

OTHER PUBLICATIONS

Maglogiannis, Ilias, and Stathes Hadjiefthymiades; "EmerLoc: Location-based services for emergency medical incidents"; International Journal of Medical Informatics 76.10 (2007); pp. 747-759.

*Primary Examiner* — Suhail Khan
(74) *Attorney, Agent, or Firm* — Kowert, Hood, Munyon, Rankin & Goetzel, P.C.

(57) ABSTRACT

This disclosure relates to transmitting an emergency message to a user equipment device (UE) over a wireless local area network (WLAN). The UE may establish a connection with an access point through WLAN. The UE may transmit, via the access point and to a network entity, an indication that the UE supports receiving emergency messaging through the WLAN. At least in part in response to communicating the indication, the UE may receive, from the network entity and via the access point, an emergency message and location information. The UE may compare the location information with a location of the UE to determine whether the UE is located within a first region specified by the location information. Based on a determination that the location of the UE is within the first region, the UE may display the emergency message on a display of the UE.

20 Claims, 15 Drawing Sheets

(51) Int. Cl.
*H04W 4/90* (2018.01)
*H04W 88/02* (2009.01)
*H04W 76/25* (2018.01)
*H04W 8/08* (2009.01)
*H04L 29/06* (2006.01)
*H04W 4/021* (2018.01)
*H04W 80/10* (2009.01)
*H04W 60/00* (2009.01)
*H04W 92/02* (2009.01)
*H04W 84/12* (2009.01)

(52) U.S. Cl.
CPC .......... *H04W 88/023* (2013.01); *H04W 84/12* (2013.01); *H04W 92/02* (2013.01)

(56) References Cited

U.S. PATENT DOCUMENTS

| | | |
|---|---|---|
| 9,980,113 B2 | 5/2018 | Miner |
| 2016/0295386 A1 | 10/2016 | Faccin |
| 2018/0332490 A1* | 11/2018 | Manepalli ............. H04W 24/08 |

* cited by examiner

US 10,721,792 B2

USER EQUIPMENT AND NETWORK PROCEDURES FOR EMERGENCY BROADCASTING ON WI-FI

PRIORITY CLAIM

This application claims priority to U.S. Provisional Patent Application No. 62/670,560, titled "User Equipment and Network Procedures for Emergency Broadcasting on Wi-Fi" and filed on May 11, 2018, which is hereby incorporated by reference in its entirety, as though fully and completely set forth herein.

TECHNICAL FIELD

The present application relates to wireless communication, including to techniques for receiving emergency messages over a wireless local area network by a user equipment device.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices, or user equipment devices (UEs) may take the form of smart phones or tablets that a user typically carries. Emergency messaging protocols are commonly used through a cellular broadcast technology to relay important geographically-relevant messages to users of UEs. However, a UE may occasionally be unable to receive cellular broadcasts, because of its location or environment, or because it is not currently powering its cellular radio. Because of the potential importance and time-sensitivity of emergency messaging, it may be desirable to expand a UE's ability to receive emergency messaging by other means, to increase the likelihood of timely reception. Therefore, improvements in the field are desired.

SUMMARY

Embodiments are presented herein of, inter alfa, systems, apparatuses, and methods for receiving, by a user equipment device (UE), emergency messages over a wireless local area network (WLAN) connection, a cellular connection, a satellite link, or a peer-to-peer relay link.

A user equipment device (UE) may comprise an antenna, a radio operably coupled to the antenna and a processing element operably coupled to the radio. The UE may be configured to establish a connection with an access point through a wireless local area network (WLAN), a cellular network, a low earth orbit (LEO) or geosynchronous equatorial orbit (GEO) satellite, or a peer to peer relay connection. The UE may transmit, via the access point and to a network entity, an indication that the UE supports receiving emergency messaging through the WLAN. At least in part in response to communicating the indication, the UE may receive, from the network entity and via the access point, an emergency message and location information. The UE may compare the location information with a location of the UE to determine whether the UE is located within a first region specified by the location information. Based on a determination that the location of the UE is within the first region, the UE may display the emergency message on a display of the UE.

If it is determined that the location of the UE is not within the first region, the UE may initiate a timer. Subsequent to initiating the timer, the UE may periodically compare the location information with an updated location of the UE to determine whether the updated location of the UE is within the first region. The UE may display the emergency message on the display of the UE if it is determined that the updated location of the UE is within the first region before expiration of the timer, and the UE may discard the emergency message if it is determined that the timer has expired without determining that the updated location of the UE is within the first region.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
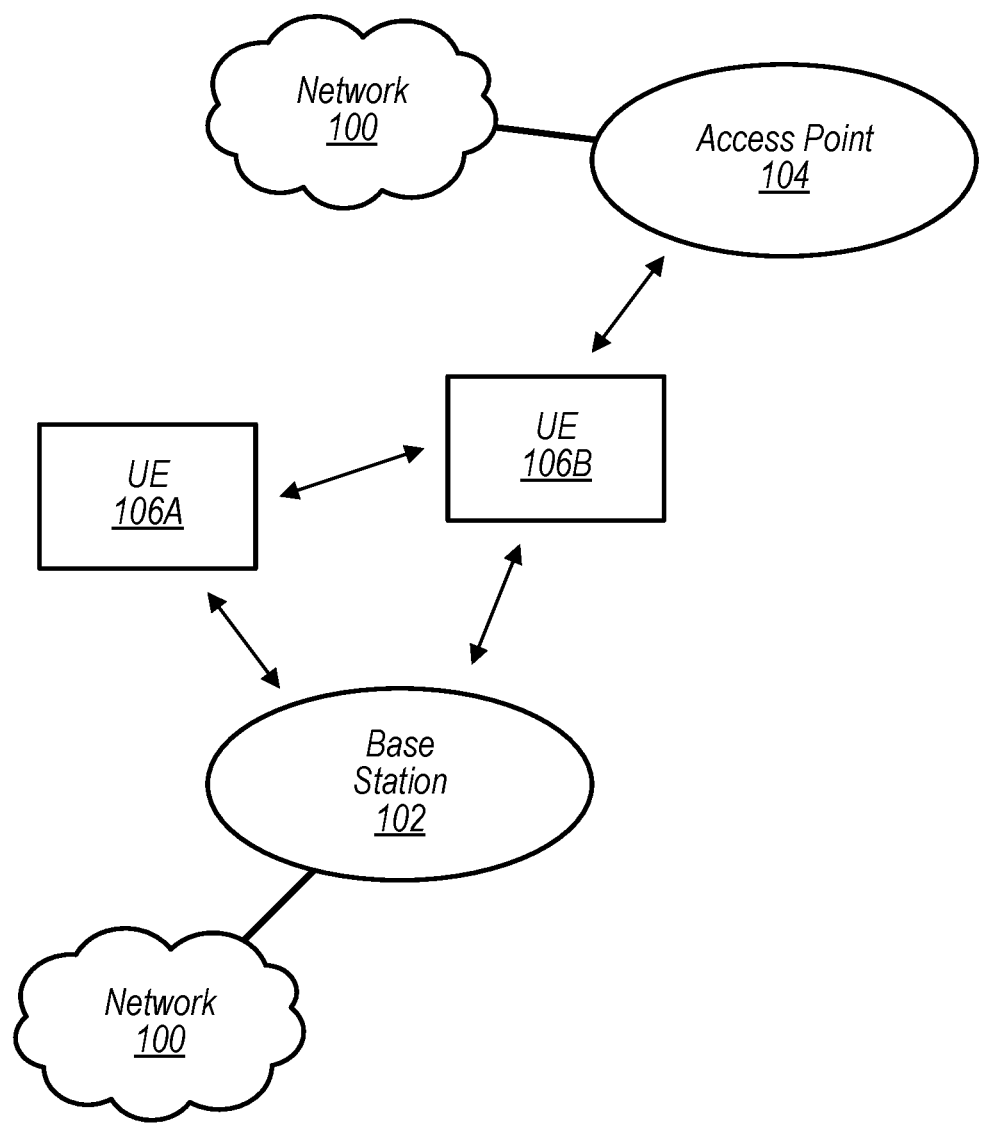
FIG. 1 illustrates an example wireless communication system including a user equipment device (UE), according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
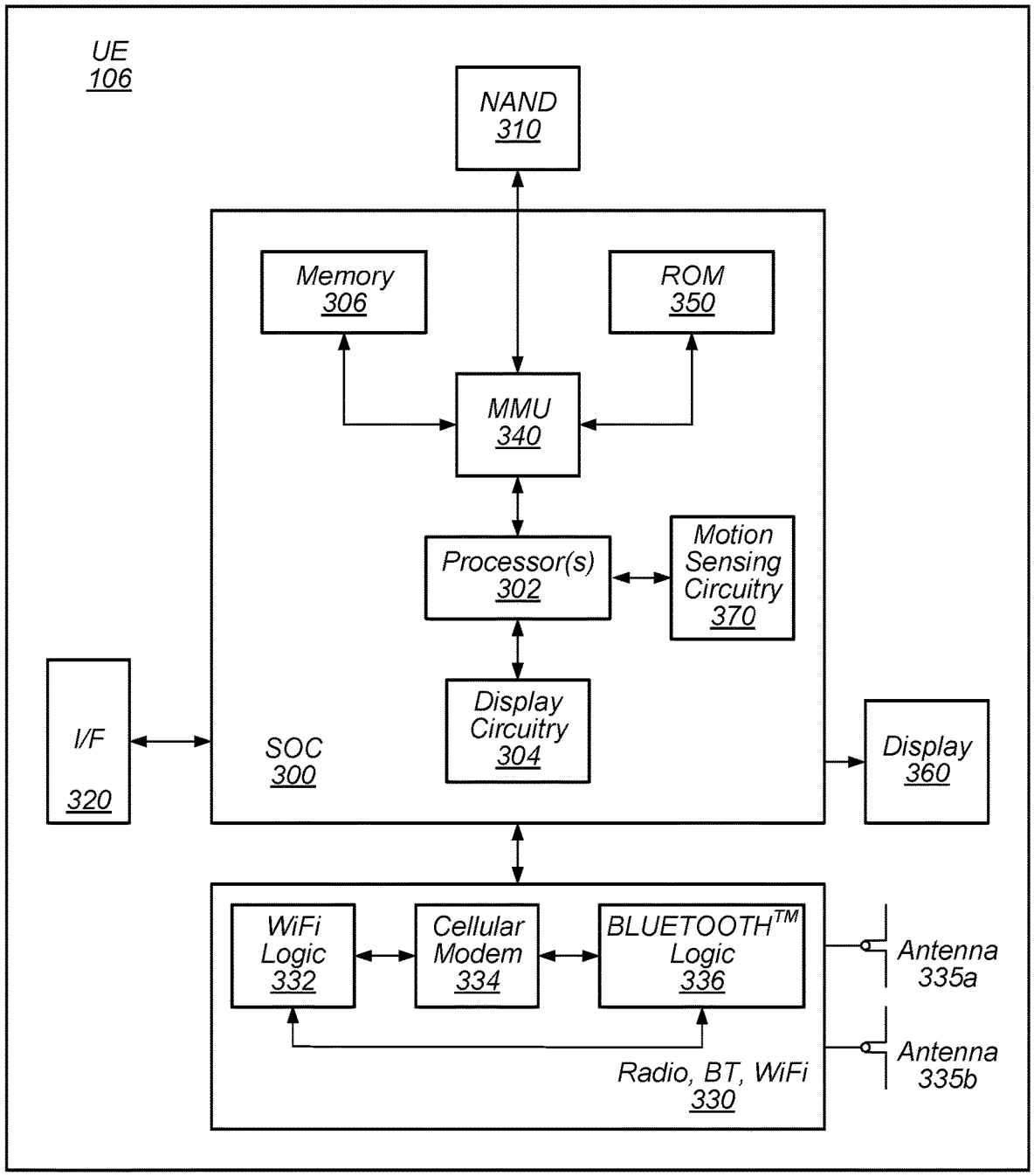
FIG. 2 is a block diagram illustrating an example UE, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc. Wireless devices 106A and 106B may be user devices, which may be referred to herein as "user equipment" (UE), UEs, or UE devices.

The base station 102 may be a base transceiver station (BTS) or cell site, and may include hardware that enables wireless communication with the UE devices 106A and 106B. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and/or between the UE devices 106 and the network 100. In other implementations, base station 102 can be configured to provide communications over one or more other wireless technologies, such as an access point supporting one or more WLAN protocols, such as 802.11a, b, g, n, ac, ad, and/or ax, LTE in an unlicensed band (e.g., LAA), a cellular network, a satellite link, or a peer-to-peer relay link.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), 5G NR, HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a geographic area via one or more cellular communication technologies.

Note that at least in some instances a UE device 106 may be capable of communicating using any of a plurality of wireless communication technologies. For example, a UE device 106 might be configured to communicate using one or more of GSM, UMTS, CDMA2000, LTE, LTE-A, 5G NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106 may be configured to communicate using only a single wireless communication technology.

As shown, the exemplary wireless communication system also includes a WLAN access point (AP) 104, which communicates over a transmission medium with the wireless device 106B. The WLAN access point, which may be a Wi-Fi AP, also provides communicative connectivity to the network 100. Thus, according to some embodiments, wireless devices may be able to connect to either or both of the base station 102 (or another cellular base station) and the access point 104 (or another access point) to access the network 100 at a given time.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc.

The UE 106B may also be configured to communicate with the UE 106A. For example, the UE 106A and UE 106B may be capable of performing direct device-to-device (D2D) communication. The D2D communication may be supported by the cellullar base station 102 (e.g., the BS 102 may facilitate discovery, among various possible forms of assistance), or may be performed in a manner unsupported by the BS 102.

The UE 106 may include a device or integrated circuit for facilitating cellular communication, referred to as a cellular modem. The cellular modem may include one or more processors (processor elements) and various hardware components as described herein. The UE 106 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. Other configurations are also possible.

FIG. 2—Example Block Diagram of a UE Device

FIG. 2 illustrates one possible block diagram of an UE device, such as UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and in some embodiments multiple antennas 335*a* and 335*b*, for performing wireless communication with base stations and/or other devices. For example, the UE device 106 may use antennas 335*a* and 335*b* to perform the wireless communication. As noted above, the UE device 106 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106 to perform Wi-Fi or other WLAN communications on an 802.11 network. The Bluetooth Logic 336 is for enabling the UE device 106 to perform Bluetooth communications. The cellular modem 334 may be a cellular modem capable of performing cellular communication according to one or more cellular communication technologies.

As described herein, UE 106 may include hardware and software components for implementing embodiments of this disclosure. For example, one or more components of the wireless communication circuitry 330 (e.g., Wi-Fi logic 332, cellular modem 334, BT logic 336) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 3:
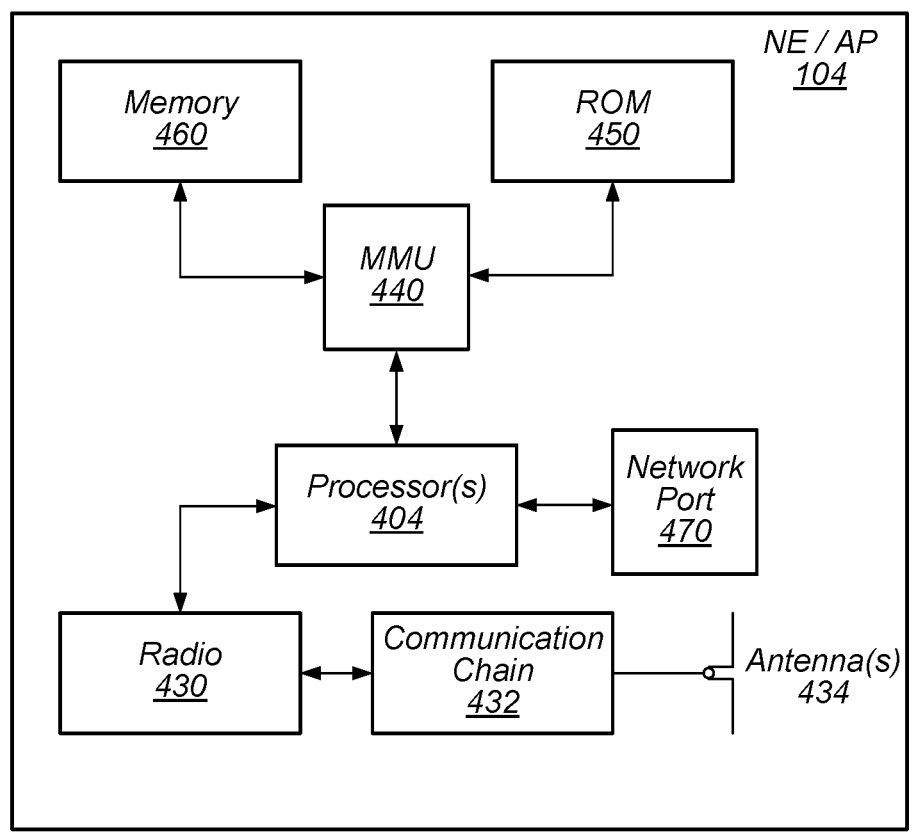
FIG. 3 is a block diagram illustrating an example network element or access point, according to some embodiments.

FIG. 3—Block Diagram of a Network Entity or Access Point

Figure 4:
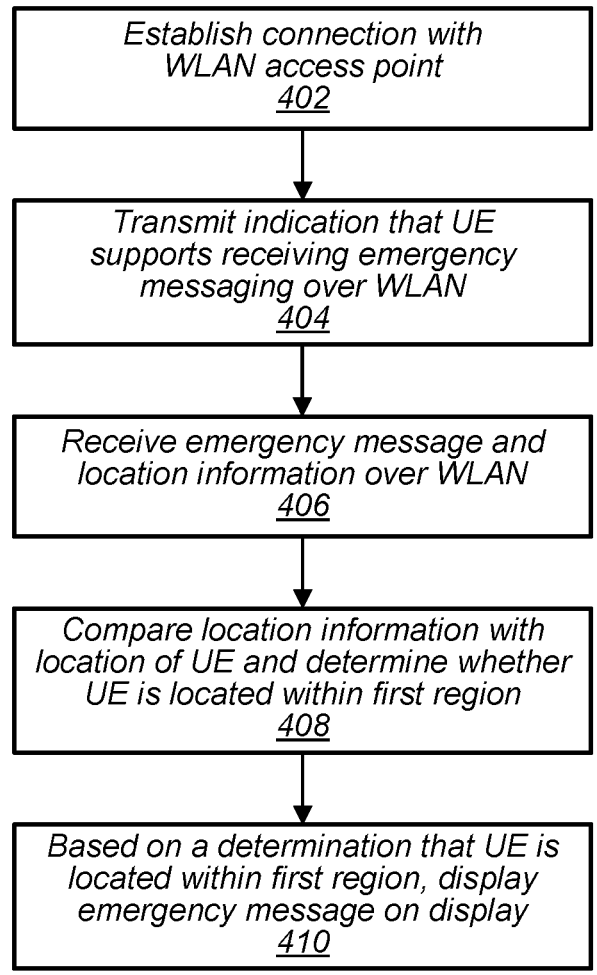
FIG. 4 is a communication flow diagram illustrating an exemplary method for transmitting emergency messages to a UE over a wireless local area network (WLAN), according to some embodiments.

FIG. 3 illustrates an example block diagram of a network entity, NE, (e.g., within the network 100) or access point 104, according to some embodiments. It is noted that the network entity of FIG. 4 is merely one example of a possible network entity. As shown, the network entity/access point 104 may include processor(s) 404 which may execute program instructions for the network entity/access point 104. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The network entity/access point 104 may include at least one network port 470. The network port 470 may be configured to couple to a telephone network and provide a plurality of devices, such as UE devices 106, access to the telephone network as described above in FIG. 1.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The network entity 102/access point 104 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The network entity/access point 104 may be configured to communicate wirelessly using multiple wireless communication standards. In some instances, the base station 102 may include multiple radios, which may enable the network entity to communicate according to multiple wireless communication technologies. For example, as one possibility, the network entity/access point 104 may include an LTE or 5G NR radio for performing communication according to LTE as well as a Wi-Fi radio for performing communication according to Wi-Fi. In such a case, the network entity/access point 104 may be capable of operating as both an LTE base station and a Wi-Fi access point. As another possibility, the network entity/access point 104 may include a multi-mode radio which is capable of performing communications according to any of multiple wireless communication technologies (e.g., NR and Wi-Fi, NR and UMTS, LTE and CDMA2000, UMTS and GSM, etc.). As still another possibility, the network entity/access point 104 may be configured to act exclusively as a Wi-Fi access point, e.g., without cellular communication capability.

As described further subsequently herein, the network entity/AP 104 may include hardware and software components for implementing or supporting implementation of features described herein. The processor 404 of the base station 102/access point 104 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the network entity/AP 104, in conjunction with one or more of the other components 430, 432, 434, 440, 450, 460, 470 may be configured to implement or support implementation of part or all of the features described herein.

Emergency Messaging via a Wireless Local Area Network

In some current implementations, emergency messaging (e.g., commercial mobile alert system (CMAS) messages, Amber Alerts, dangerous weather warnings, crime alerts, etc.) to UE devices may be implemented via a cellular broadcast technology. For example, upon receipt of an emergency message, a base station or emergency messaging forwarding center (e.g., a commercial mobile service provider gateway) may broadcast the emergency message to all UE devices connected to the base station or forwarding center. In some cases, for various reasons, a UE device may not be connected to a base station via a cellular connection, thus rendering the UE incapable of receiving emergency messaging via cellular broadcast. Even though a cellular connection is not available and/or active, the UE may have another type of connection available (e.g., a wireless local area network (WLAN) connection such as Wi-Fi, a satellite link, or a peer-to-peer relay link). For example, a UE may be connected to a WLAN and may temporarily power down its cellular radio to reduce energy expenditure. In other words, devices with cellular capability may camp only on Wi-Fi and may deactivate their cellular connection to reduce power consumption. Alternatively, a UE may be in a location with poor cellular reception, but the UE may have access to a strong WLAN signal. Alternatively, a UE device may be equipped with only a WLAN radio and may not be able to connect to a base station via cellular technology. For example, some UE devices such as some smart watches or portable music players (e.g., an iPod™) may not be equipped with cellular capability, but may support Wi-Fi calling, for example, through the 3GPP S2b protocol. Additionally, 5G New Radio (NR) capable UE devices may be configured to perform voice over Wi-Fi based on 3GPP untrusted access over a N3IWF interface. As carriers upgrade networks from legacy evolved packet core (EPC) to 5G NR, this new architecture may be used by Wi-Fi only or Wi-Fi/cellular UEs.

In these embodiments, it may be advantageous for the UE to be able to receive emergency messages through the WLAN connection. Embodiments herein present novel systems and methods for transmitting emergency messages to a UE device through a WLAN connection.

While embodiments herein are described in terms of receiving emergency messages through a WLAN connection, it may be understood that the described methods and devices may alternatively employ either a cellular network, a satellite link, or a peer-to-peer relay link over either a cellular or WLAN connection for indicating support for receiving emergency messages and/or for receiving emergency messages, as desired. For example, embodiments are described wherein a UE transmits an indication that the UE supports receiving emergency messaging through a WLAN, and receives emergency messaging through the WLAN. However, any of a variety of wireless networks including cellular networks, satellite links, peer-to-peer links over a cellular connection, or peer-to-peer links over a WLAN connection, among other possibilities, may also be utilized for transmitting the indication and/or receiving the emergency messaging, as desired.

Impact of Regulatory Requirements on Emergency Messaging

It is anticipated that regulatory requirements regarding the handling of emergency messaging may change in the future. For example, it is anticipated that regulatory agencies such as the Federal Communications Commission (FCC) in the United States may implement narrower geo-targeting requirements for emergency messaging protocols. For example, regulatory requirements may require that emergency messaging that is associated with a particular area by a geocode, circle, or polygon is delivered to an area that closely approximates the specified geocode, circle, or polygon. Additionally, regulatory requirements may determine that a UE should preserve the emergency message until it is displayed to the user. For example, this requirement may apply to UEs that are connected to a Carrier Core network through cellular or Wi-Fi.

To address these and other considerations, embodiments herein describe various solutions to deliver emergency messages to UEs through a WLAN connection. In some embodiments, methods are described to deliver emergency messages to a UE connected through Wi-Fi S2b to an EPC core network. As described in greater detail below, the delivery of emergency messages may be accomplished by utilizing signaling between the UE and an evolved packet data gateway (ePDG) through IKEv2 messages, or by utilizing signaling between the UE and an ePDG via an IMS using SIP messages, according to various embodiments. In other embodiments, methods are described to deliver emergency messages to a UE connected through a Wi-Fi untrusted connection to a 5G NR core network. In these embodiments, signaling between the UE and a N3IWF may be utilized through network access stratum (NAS) messages.

In one embodiment, emergency messages may be transmitted to a UE via a Wi-Fi S2b connection to an EPC through an ePDG. In some embodiments, a single ePDG may have coverage over a wide geographic area (e.g., national coverage, statewide coverage, etc.), so that all devices in the wide geographic area may be connected through S2b to the same ePDG. As a result, the network may be unable to infer a UE's position based on the ePDG associated with the particular UE, and may thereby be unable to determine whether UEs in communication with the ePDG should receive a particular emergency message associated with a particular location or region. Additionally, for privacy considerations, it may be undesirable for the UEs in communication with an ePDG to inform the ePDG of their locations. Since emergency messages are typically relevant for users of UEs in a particular geographic area (e.g., an area with dangerous weather or that experienced a terrorist attack, etc.), this may difficulties in ensuring that emergency messages relevant to a particular geographic area arrive to UEs located within that area. As described in detail below, embodiments herein efficiently address these and other difficulties without violating the location privacy of the users of UEs.

FIGS. 4—Flowchart

FIG. 4 is a flowchart diagram illustrating a method for delivering emergency messages to a UE over a wireless local area network, according to some embodiments. In various embodiments, some of the elements of the methods shown may be performed concurrently, in a different order than shown, may be substituted for by other method elements, or may be omitted. Additional method elements may also be performed as desired. As shown, the method may operate as follows.

At 402, a UE may establish a connection with an access point (AP) through a wireless local area network (WLAN). The UE may establish a connection with an access point using any or all of Bluetooth, Wi-Fi, near field communication (NFC), and/or any of various other possible short-range communication protocols, according to some embodiments. Additionally, the UE may be capable of performing cellular communication according to 3G, LTE, and/or 5G NR radio access technologies, according to some embodiments. The UE may discover the WLAN AP by sending out a probe request, receiving a beacon advertising availability of a WLAN network provided by the WLAN access point, or in any other desired manner. Establishing a connection with the WLAN access point may include exchanging configuration settings, authentication information, and/or any of various other possible types of information to allow the UE to communicate with other devices associated with the WLAN network and/or other networks (e.g., one or more wide area networks such as the Internet, a cellular core network, a public switched telephone network, a 5G NR cellular network, etc.), e.g., via a backhaul connection of the WLAN AP. In some embodiments, the WLAN AP may provide a network that is open/unencrypted/unprotected (e.g., that does not require a password/passphrase) and/or a network that is closed/encrypted/protected (e.g., that does require a password/passphrase). In some instances, user input (e.g., to select a network provided by the WLAN AP, to enter a password/passphrase requested by the WLAN AP, to complete captive portal registration requested by the WLAN AP, etc.) may be provided by a user of the UE as part of the discovery and/or association process.

In some embodiments, the connection between the UE and the access point may be used to establish a connection between the UE and a network entity. The network entity may be connected to the access point via an internet protocol (IP) connection. In some embodiments, the network entity may comprise an evolved packet data gateway (ePDG). In other embodiments, the network entity may comprise an internet protocol multimedia subsystem (IMS) that is in turn connected to an ePDG, wherein the IMS enables the UE to conduct voice over internet protocol (VoIP) calls via the internet. In some embodiments, the ePDG may be configured to communicate with the internet (e.g., via a packet data node gateway, PGW) and/or to communicate with a commercial mobile service provider (CMSP) gateway that is configured to deliver emergency messages.

In some embodiments, the network entity may be an access and mobility management function (AMF) server that operates according to a 5G NR radio access technology (RAT). In these embodiments, the AMF server may be connected to one or more WLAN access points via one or more Non-3GPP InterWorking Function (N3IWF) network slices. The AMF server may be configured to communicate with one or more 5G cellular base stations in addition to communicating with the one or more WLAN access points. The AMF server may additionally be configured to receive emergency messaging from a SMSP gateway via a Cell Broadcast Centre Functionality (CBCF).

At 404, the UE may transmit, via the access point and to a network entity, an indication that the UE supports receiving emergency messaging (e.g., such as CMAS messages) through the WLAN. In some embodiments where the access point is in direct communication with an ePDG, the indication that the UE supports receiving emergency messaging through the WLAN may be included within an internet key exchange version 2 (IKEv2) informational request. In other embodiments where the access point is in communication with the ePDG via an IMS (e.g., when the UE is conducting a VoIP call via the IMS), the indication that the UE supports receiving emergency messaging through the WLAN may be included within a session initiation protocol (SIP) subscribe request. In some embodiments where the access point is in communication with an AMF server according to a 5G RAT, the indication that the UE supports receiving emergency messaging through the WLAN may be included within a non-access stratum (NAS) registration request.

Advantageously, the UE may send the indication that the UE supports receiving emergency messages without sending its current location to the network entity, thus preserving location privacy of the UE. As described in further detail below, the UE may determine whether to display a received emergency message based on its location and received location information, without informing the network of its location.

At 406, at least in part in response to communicating the indication, the UE may receive, from the network entity and via the access point, an emergency message and location information. The emergency message and location information may have been received by a CMSP gateway from an emergency messaging entity such as a national or regional governmental agency and may have been transmitted by the CMSP gateway to the network entity for distribution to UEs serviced by the network entity. The emergency message may comprise any of a commercial mobile alert system (CMAS) message, an Amber Alert message, or another type of emergency message. The emergency message may additionally comprise validity information. For example, the validity information may specify a period of time for which the emergency message is relevant. In embodiments where the network entity is an ePDG, the emergency message and location information may be transmitted to the UE within an IKEv2 informational request message. In embodiments where the network entity is an IMS server, the emergency message and location information may be transmitted to the UE through an ePDG within a SIP notify request message. In embodiments where the network entity is an AMF server, the emergency message and location information may be transmitted to the UE within a DL NAS transport message. The AMF may additionally transmit the emergency message to one or more cellular base stations, which may broadcast the emergency message using 5G cellular broadcast technology. The location information may specify geofencing area coordinates that indicate the region or regions for which the emergency message is intended.

In some embodiments, prior to transmitting the emergency message and location information to the UE, the network entity may determine an internet protocol (IP) address associated with the UE. For example, the UE may be given an IP address upon establishing a connection with the WLAN AP. The network entity may determine an approximate location associated with the IP address. For example, although the IP address may not specify a specific location of the UE, it may be associated with an approximate location, such as a state, county, or municipal area. The network entity may determine whether the approximate location associated with the IP address is commensurate with the first region (e.g., the geofencing area) indicated by the location information. If it is determined that the approximate location associated with the IP address is commensurate with the first region, the network entity may transmit the emergency message and location information to the UE. On the other hand, if the approximate location indicates a particular state (e.g., Nevada), but the first region is a region within a different state (e.g., Oregon), the network entity may determine that the emergency message is not relevant to the UE, and may not forward the emergency message and the location information to the UE. The network entity may transmit the emergency message and location information to all UEs that have indicated a capability to receive emergency messages over WLAN, or it may transmit the emergency message and location information to only those UEs that have indicated a capability to receive emergency messages over WLAN that are also associated with a geographically relevant IP address.

At 408, the UE may compare the location information with a location of the UE to determine whether the UE is located within a first region specified by the location information. The first region may be a geofencing area specified by the location information. For example, the UE may determine, based on the location information and the location of the UE, whether the emergency message is relevant to the UE. In some embodiments, after receiving the emergency message and location information, the UE may forward the emergency message and location information to a host IMS or SIP stack, or an IPSec engine for processing. The UE may utilize a location engine to check whether the UE is located within a geofencing area specified by the location information.

At 410, based on a determination that the location of the UE is within the first region, the UE may display the emergency message on a display of the UE. In some embodiments, the UE may additionally determine from validity information included within the emergency message if the emergency message is still relevant and may only display the message if the emergency message is still relevant. For example, if the validity information indicates a period of time, and the UE receives the emergency message outside of the period of time, the UE may determine not to display the emergency message.

If it is determined that the location of the UE is not within the first region, the UE may initiate a timer. While the timer is running, the UE may periodically determine whether an updated location of the UE is within the geofencing area specified by the location information (e.g., using the location engine to compare the location information to the updated location of the UE). If it is determined that the UE has moved such that its updated location is within the first region before expiration of the time, the UE may display the emergency message on the display of the UE. On the other hand, if the timer expires and the UE has not determined that an updated location of the UE is within the first region, the UE may discard the emergency message. The duration of the timer may be predetermined based on policy considerations associated with the emergency messaging protocol, or it may be specified by data included within the emergency message. For example, validity information included within the emergency message may specify a period of time during which the emergency message is relevant, and the timer may be set to expire at the conclusion of the specified period of time.

Figure 5:
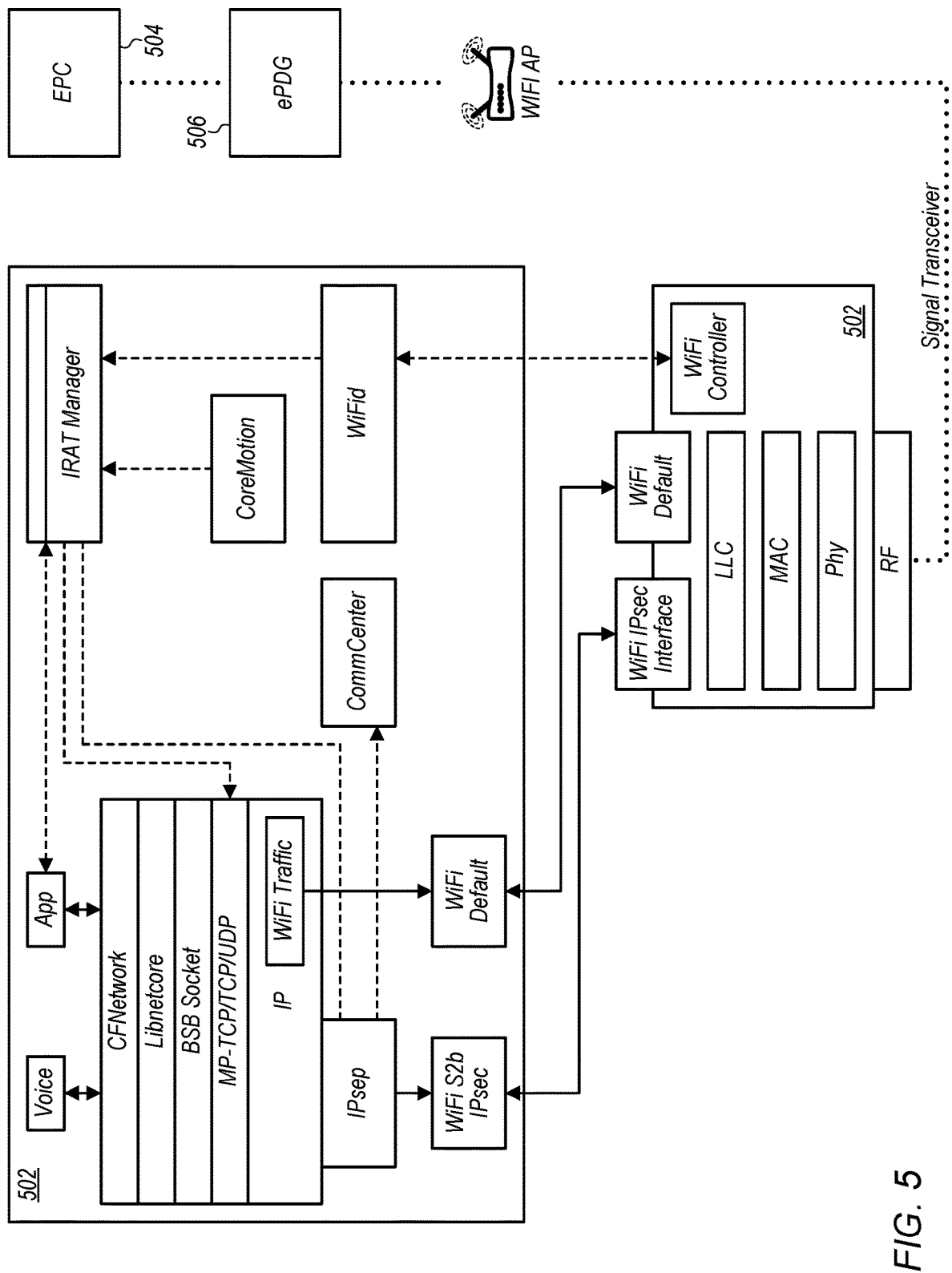
FIG. 5 is a system diagram illustrating a connection between a UE and an evolved packet data gateway (ePDG) utilizing Wi-Fi, according to some embodiments.
Figure 6:
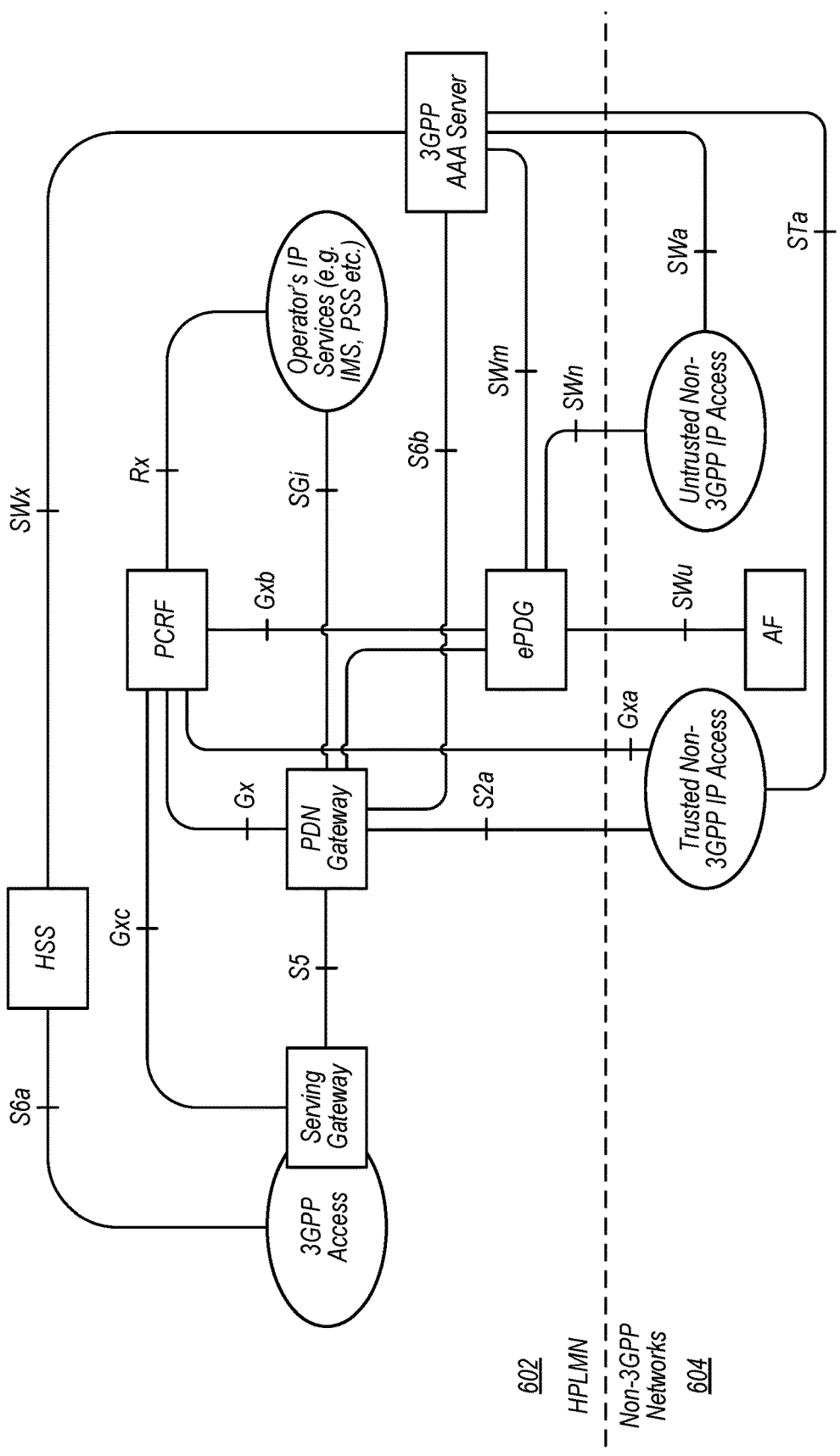
FIG. 6 is a system communication diagram illustrating the various network elements involved in the communication between the UE and the network through an ePDG, according to some embodiments.

FIGS. 5-6—Communication Diagrams for UE-ePDG Connection Through Wi-Fi

FIGS. 5-6 are schematic diagrams illustrating a communication system between a Wi-Fi connected UE device and an ePDG. FIG. 5 illustrates in greater detail the components of the UE which serve to communicate with the Wi-Fi access point. FIG. 6 is a detailed system communication diagram of the various network elements involved in the communication between the UE and the network.

Figure 7:
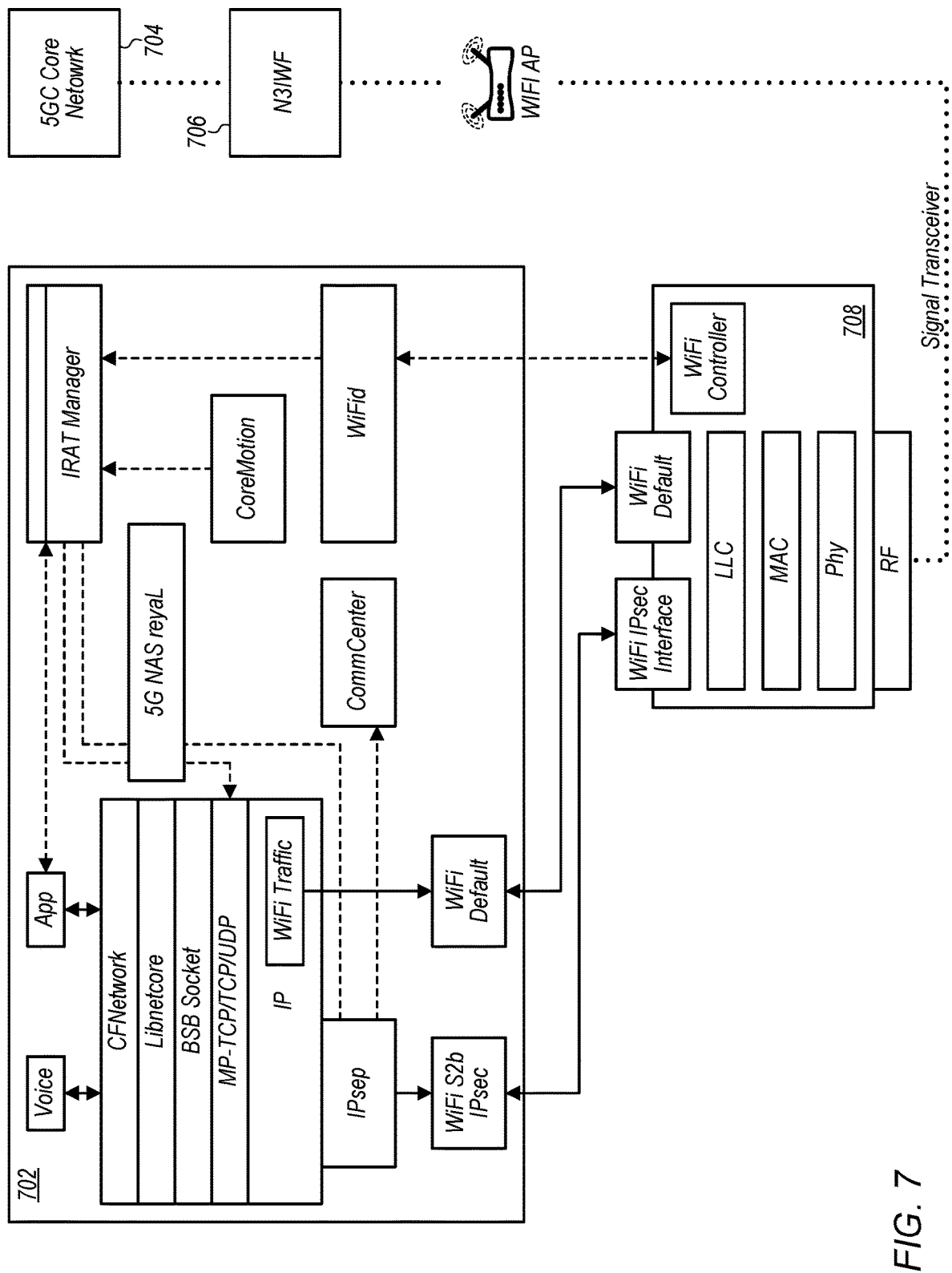
FIG. 7 is a system diagram illustrating a connection between a UE and a 5GC core network utilizing Wi-Fi according to a 5G radio access technology, according to some embodiments.
Figure 8:
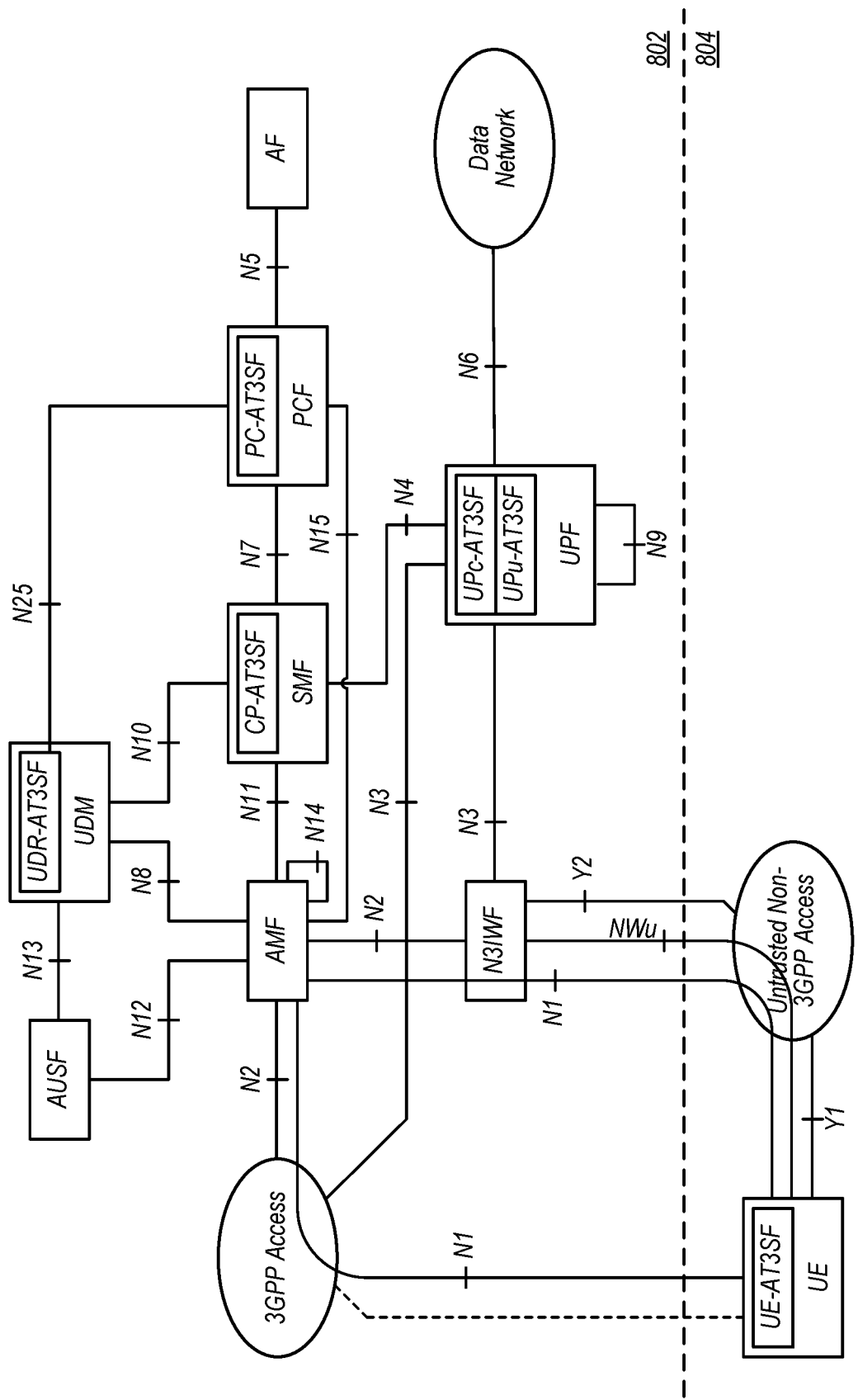
FIG. 8 is a system communication diagram illustrating the various network elements involved in the communication between the UE and the network through a 5GC core network, according to some embodiments.

FIGS. 7-8 Communication Diagrams for UE-5GC Connection Through Wi-Fi

FIGS. 7-8 are schematic diagrams illustrating a communication system between a Wi-Fi connected UE device in communication with a 5GC core network through a NSIWF slice according to a 5G NR radio access technology (RAT). FIG. 7 illustrates in greater detail the components of the UE which serve to communicate with the Wi-Fi access point. FIG. 8 is a detailed system communication diagram of the various network elements involved in the communication between the UE and the 5G network.

Figure 9:
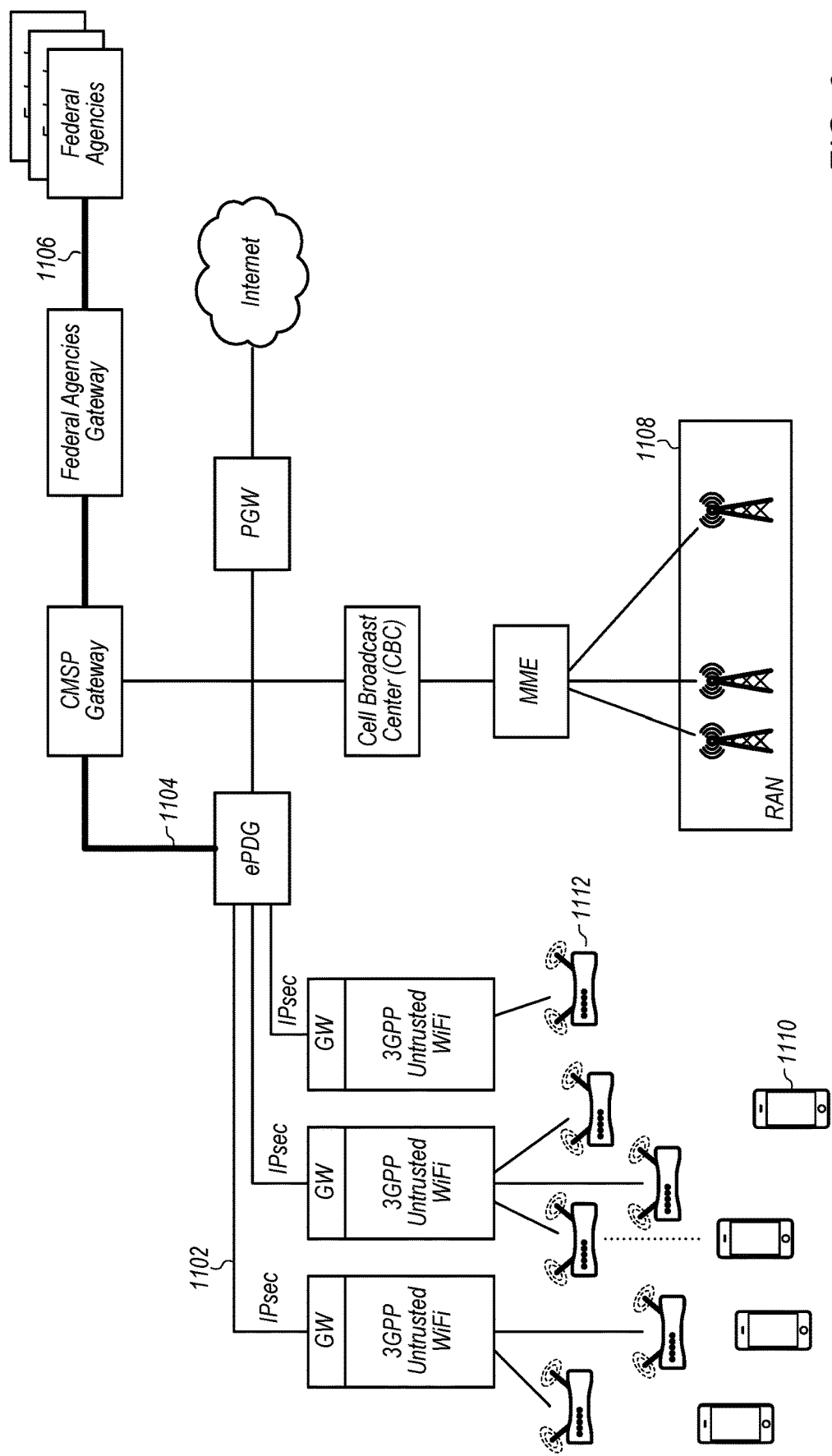
FIG. 9 is a system communication diagram illustrating how to utilize an ePDG to distribute emergency messaging to a UE using a WLAN, according to some embodiments.
Figure 10:
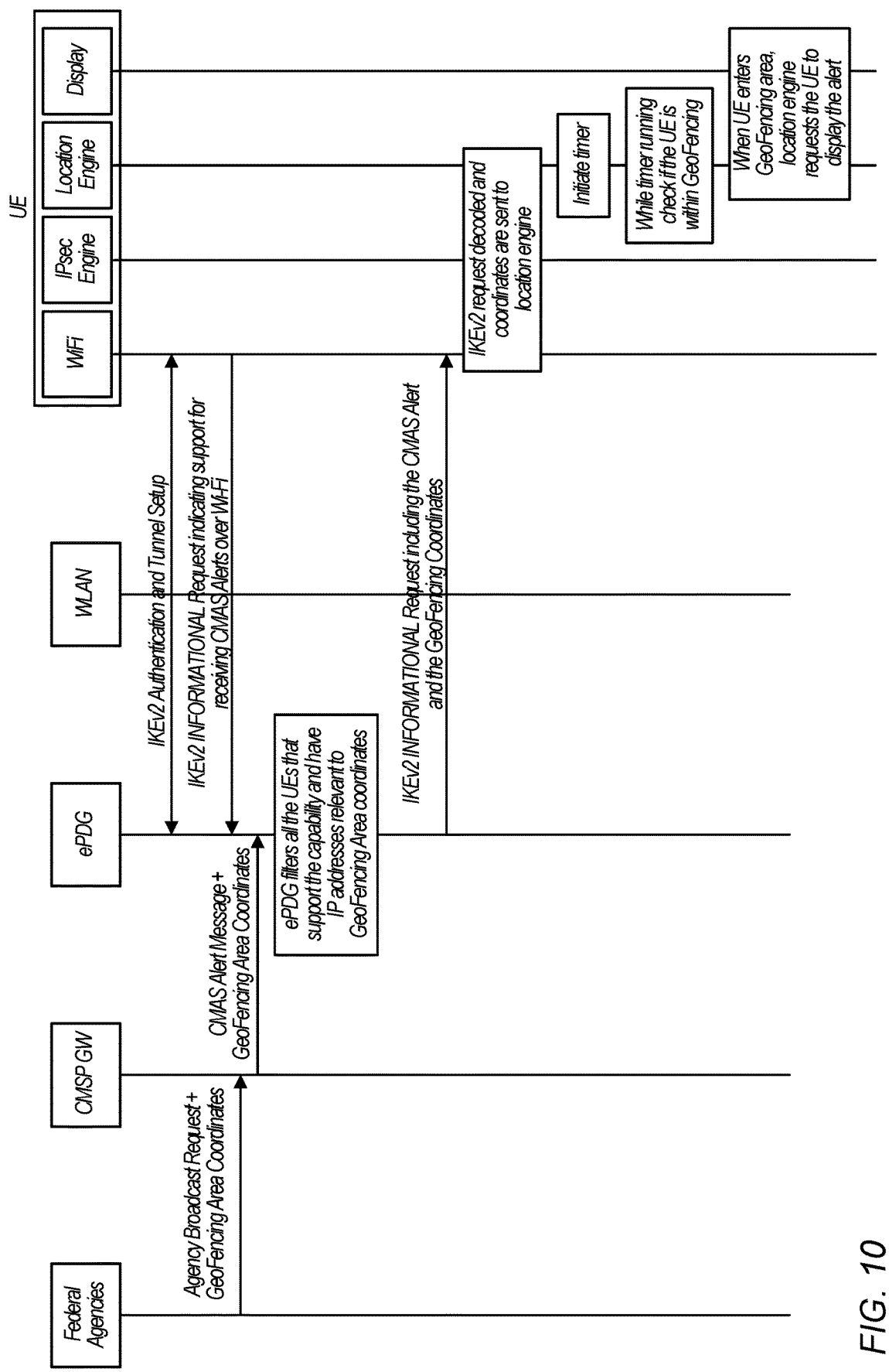
FIG. 10 is a communication flow diagram corresponding to the system diagram illustrated in FIG. 9, according to some embodiments.

FIGS. 9-10—Emergency Messaging Using an ePDG

FIGS. 9 and 10 are a system communication diagram utilizing an ePDG to distribute emergency messaging, and the corresponding communication flow diagram, respectively. FIG. 9 illustrates the components involved in one of the embodiments described in reference to the flowchart of FIG. 4, and FIG. 10 illustrates the corresponding communication flow diagram.

Figure 11:
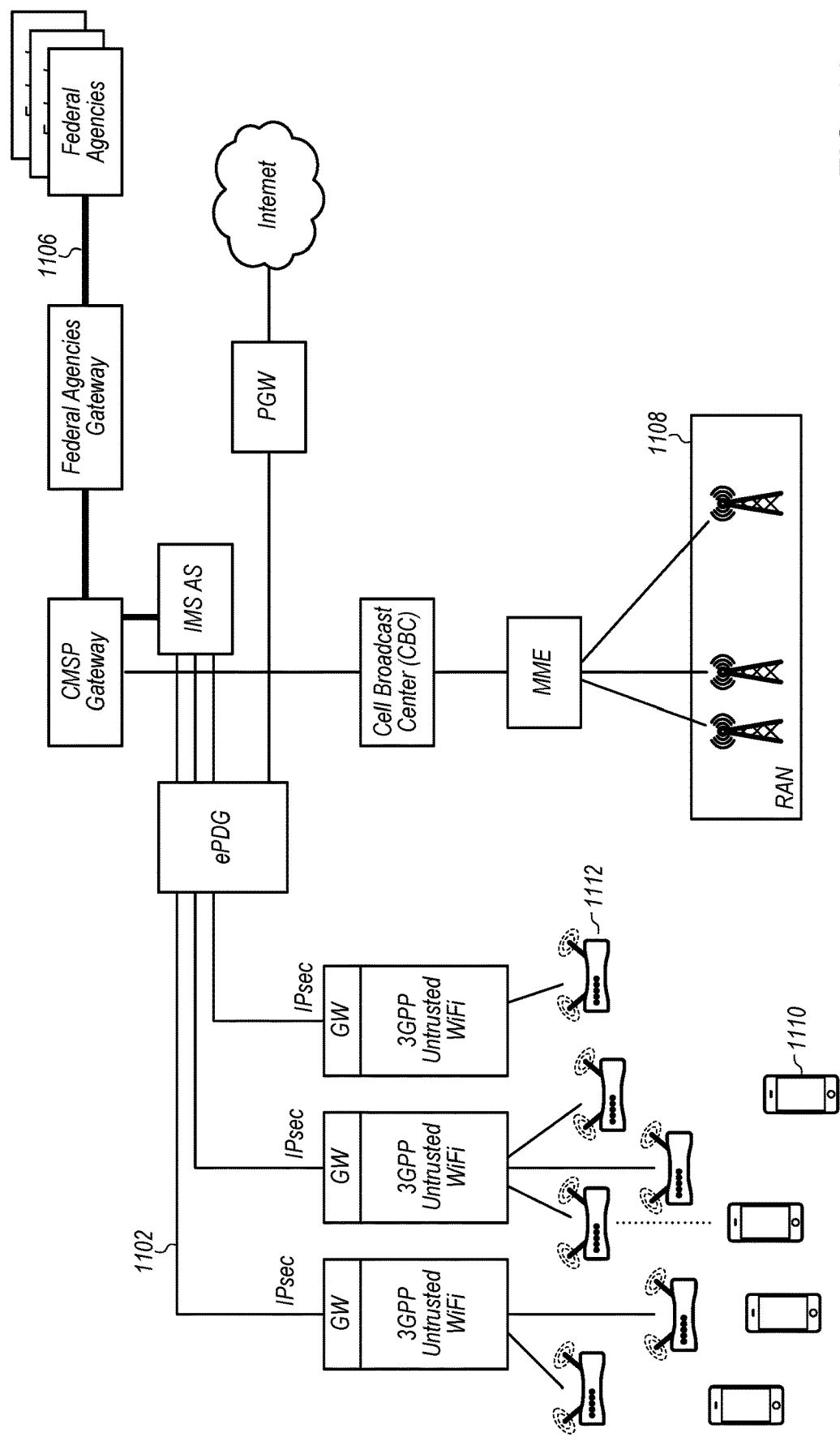
FIG. 11 is a system communication diagram illustrating how to utilize an internet protocol multimedia subsystem (IMS) application server to distribute emergency messaging to a UE using a WLAN, according to some embodiments.
Figure 12:
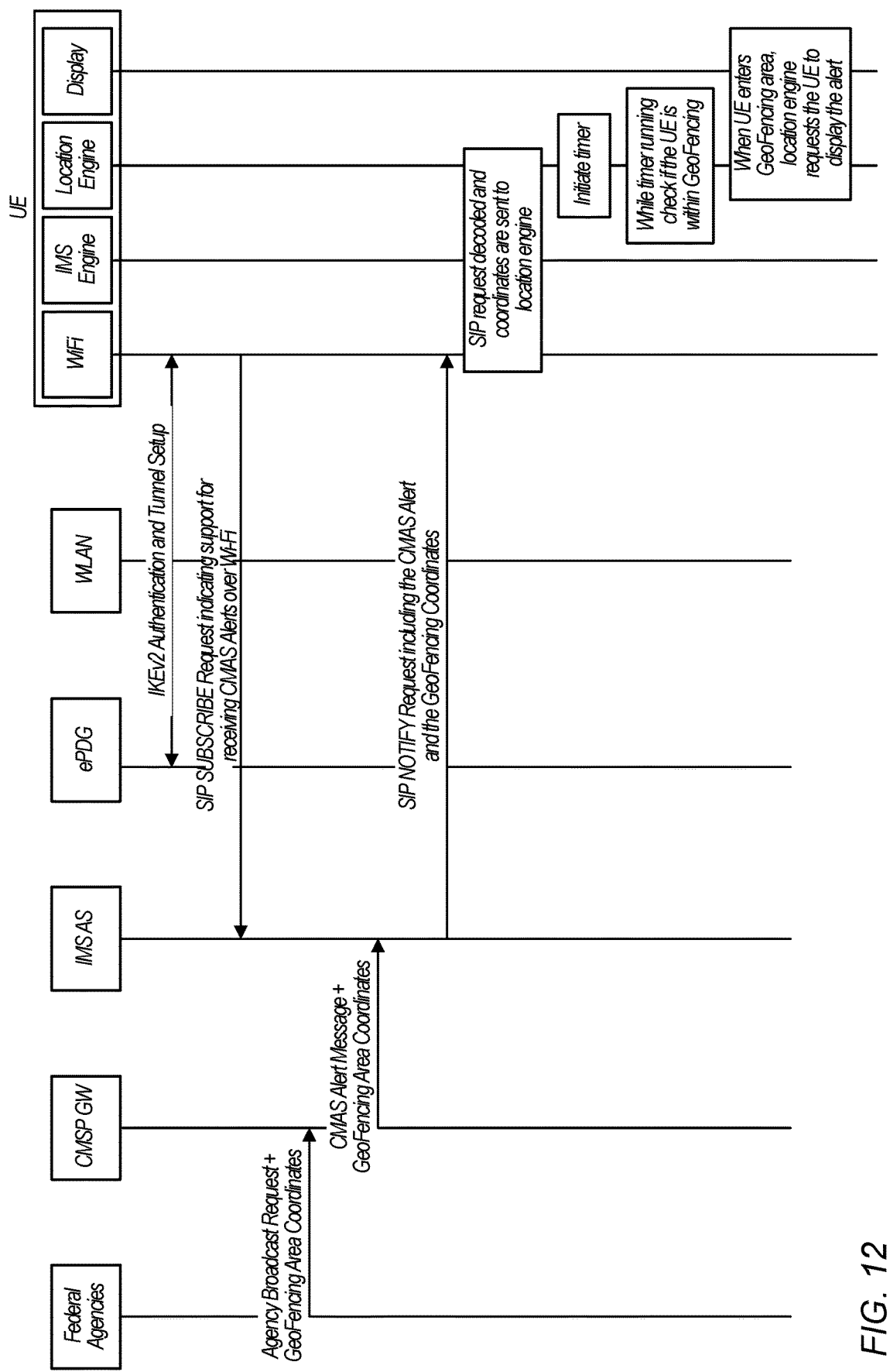
FIG. 12 is a communication flow diagram corresponding to the system diagram illustrated in FIG. 11, according to some embodiments.

FIGS. 11-12—Emergency Messaging Using an IMS Application Server

FIGS. 11 and 12 are a system communication diagram utilizing an IMS Application Server to distribute emergency messaging, and the corresponding communication flow diagram, respectively. FIG. 11 illustrates the components involved in one of the embodiments described in reference to the flowchart of FIG. 4, and FIG. 12 illustrates the corresponding communication flow diagram.

Figure 13:
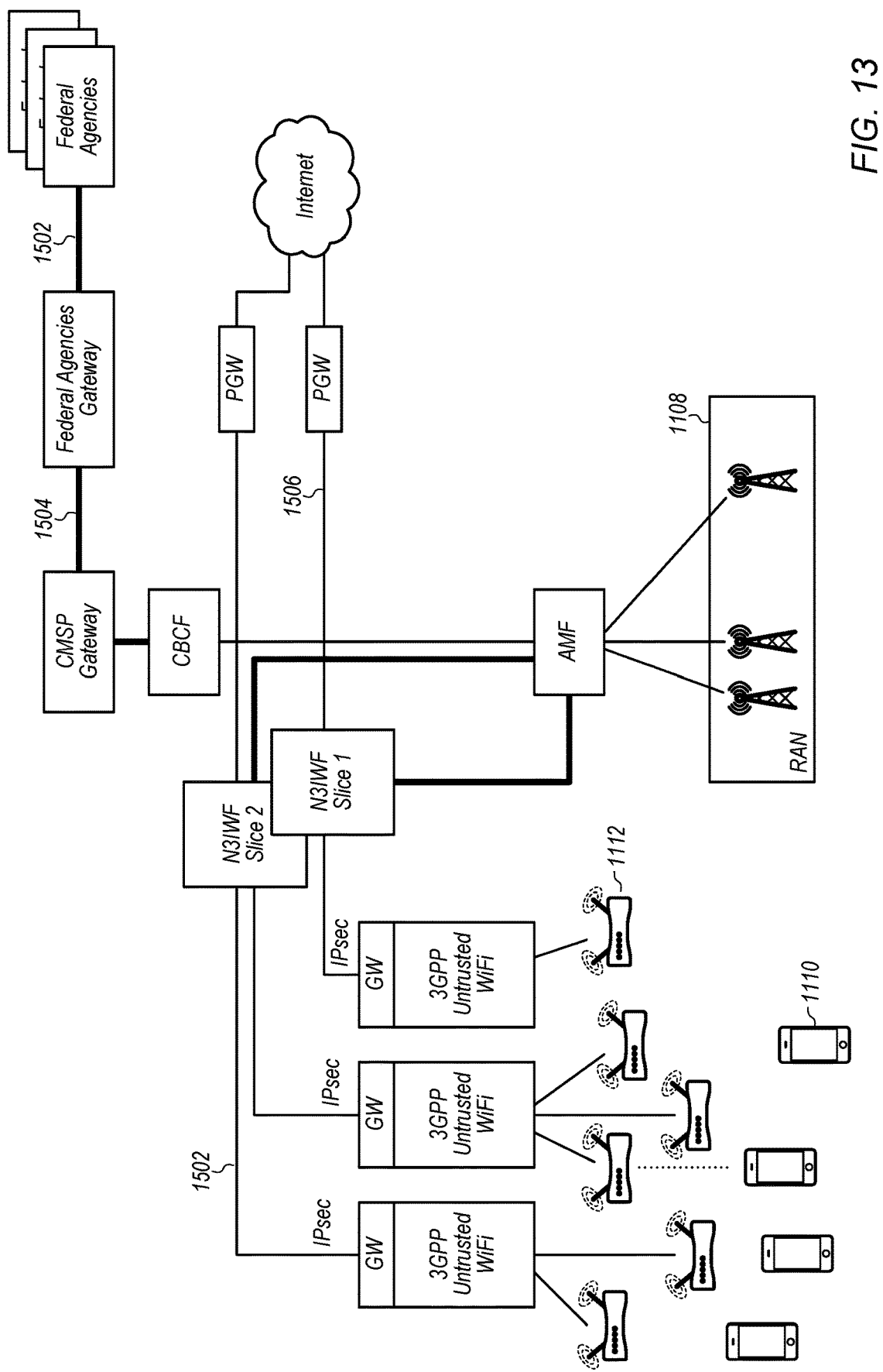
FIG. 13 is a system communication diagram illustrating how to utilize an access and mobility management function (AMF) server operating according to a 5G radio access technology to distribute emergency messaging to a UE using a WLAN, according to some embodiments.
Figure 14:
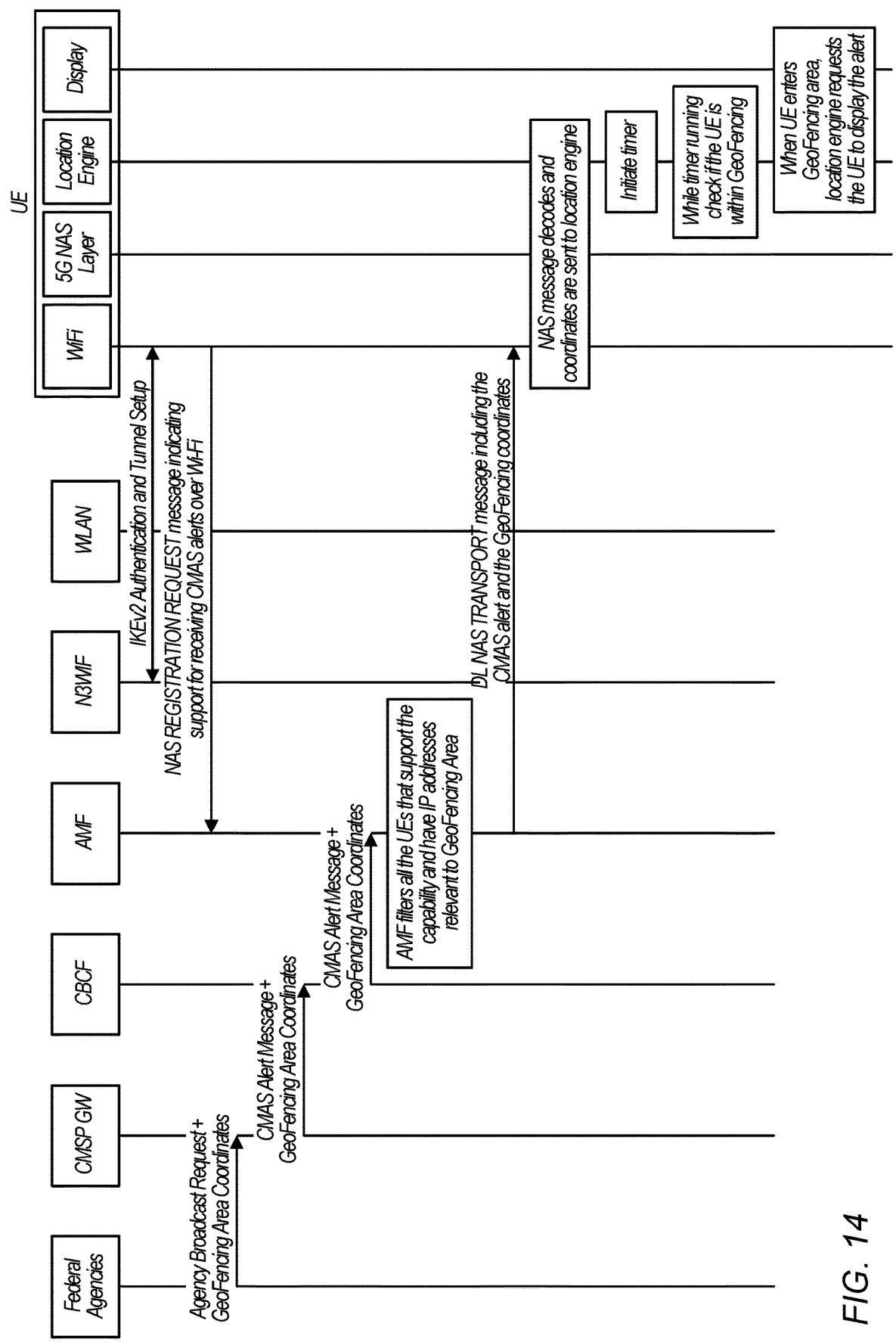
FIG. 14 is a communication flow diagram corresponding to the system diagram illustrated in FIG. 13, according to some embodiments.

FIGS. 13-14—Emergency Messaging Using an AMF Server

FIGS. 13 and 14 are a system communication diagram utilizing an AMF server to distribute emergency messaging utilizing a 5G RAT, and the corresponding communication flow diagram, respectively. FIG. 13 illustrates the components involved in one of the embodiments described in reference to the flowchart of FIG. 4, and FIG. 14 illustrates the corresponding communication flow diagram.

Figure 15:
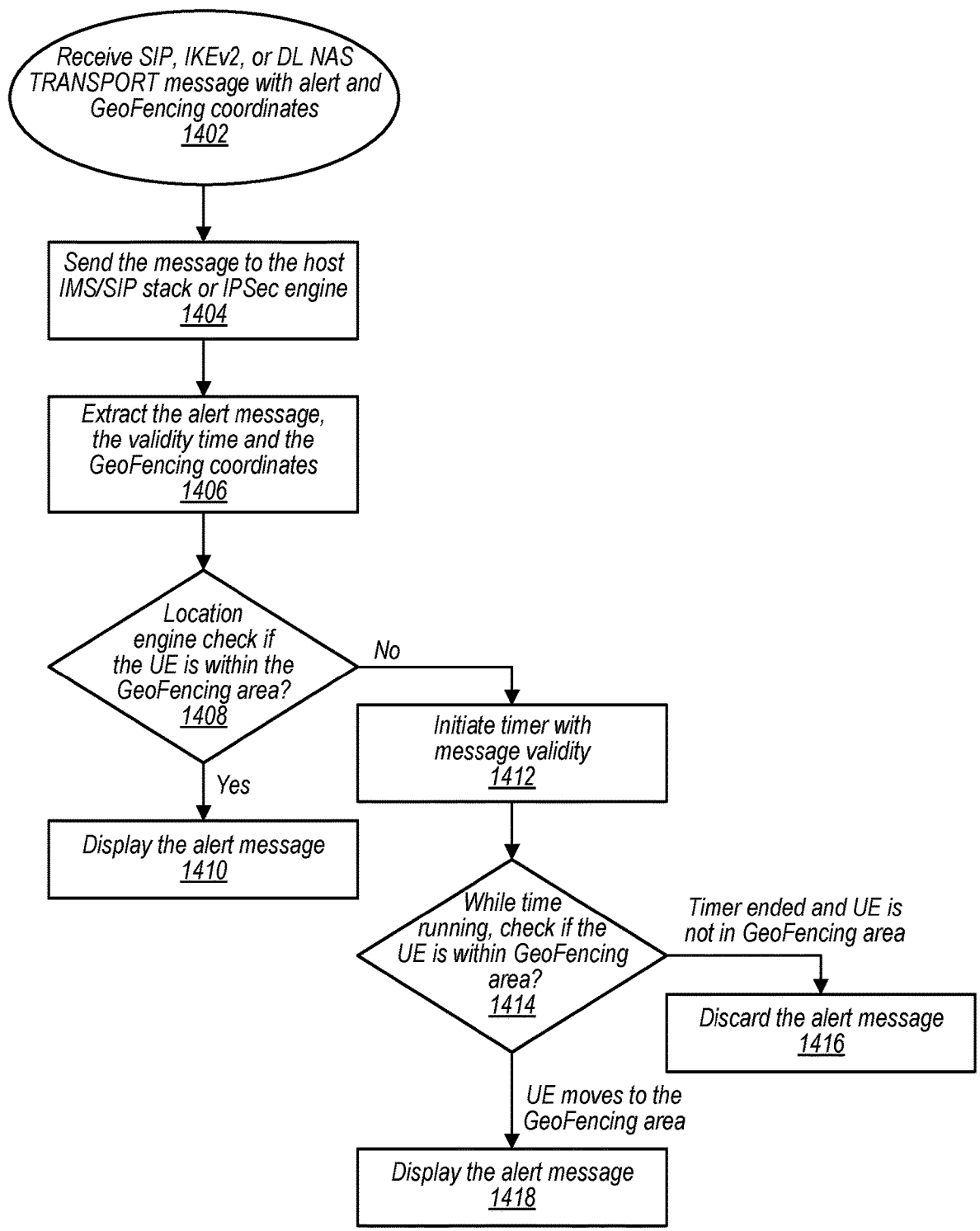
FIG. 15 is a detailed flowchart illustrating the internal processing performed by a UE upon receiving an emergency message and location information, according to some embodiments.

FIG. 15—Flowchart for UE Processing of Emergency Message and Location Information FIG. 15 is a detailed flowchart illustrating the internal processing performed by a UE upon receiving an emergency message and location information. FIG. 15 describes similar embodiments to those described in reference to FIG. 4. However, FIG. 15 includes additional detail regarding the internal processing between different computational elements of the UE. For example, FIG. 15 describes in greater detail the interface between the Wi-Fi radio, the IMS engine or 5G non-access stratum (NAS) layer, the location engine, and the display of the UE. Note that the processing roles played by each of the separate components of the UE are similarly described in the communication flow diagrams of FIGS. 10, 12, and 14, according to various embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   an antenna;
   a radio operably coupled to the antenna; and
   a processing element operably coupled to the radio;
   wherein the antenna, radio, and processing element are configured to:
      establish a connection with an access point through a wireless local area network (WLAN);
      transmit, via the access point and to a network entity, an indication that the UE supports receiving emergency messaging through the WLAN;
      at least in part in response to communicating the indication, receive, from the network entity and via the access point, an emergency message and location information;
      compare the location information with a location of the UE to determine whether the UE is located within a first region specified by the location information; and
      based on a determination that the location of the UE is within the first region, display the emergency message on a display of the UE.

2. The UE of claim 1, wherein the antenna, radio, and processing element are further configured to:
   based on a determination that the location of the UE is not within the first region:
      initiate a timer;
      subsequent to initiating the timer, periodically compare the location information with an updated location of the UE to determine whether the updated location of the UE is within the first region;
      display the emergency message on the display of the UE based on a determination that the updated location of the UE is within the first region; and
      discard the emergency message based on a determination that the timer has expired without determining that the updated location of the UE is within the first region.

3. The UE of claim 1,
   wherein the network entity is an evolved packet data gateway (ePDG); and
   wherein the indication that the UE supports receiving emergency messaging through the WLAN is included within an internet key exchange version 2 (IKEv2) informational request.

4. The UE of claim 1,
   wherein the network entity is an internet protocol multimedia subsystem (IMS) application server; and
   wherein the indication that the UE supports receiving emergency messaging through the WLAN is included within a session initiation protocol (SIP) subscribe request.

5. The UE of claim 4,
   wherein the emergency message and the location information are included within a session initiation protocol (SIP) notify request.

6. The UE of claim 1,
   wherein the network entity is an access and mobility management function (AMF) server associated with a 5G radio access technology; and
   wherein the indication that the UE supports receiving emergency messaging through the WLAN is included within a non-access stratum (NAS) registration request.

7. The UE of claim 6,
wherein the UE communicates with the AMF server through a Non-3GPP InterWorking Function (N3IWF) network slice.

8. A method for a user equipment device (UE) to receive emergency messaging, the method comprising:
establishing a wireless connection with an access point;
transmitting, via the access point and to a network entity, an indication that the UE supports receiving emergency messaging;
at least in part in response to communicating the indication, receiving, from the network entity and via the access point, an emergency message and location information;
comparing the location information with a location of the UE to determine whether the UE is located within a first region specified by the location information; and
based on a determination that the location of the UE is within the first region, displaying the emergency message on a display of the UE.

9. The method of claim 8, the method further comprising:
based on a determination that the location of the UE is not within the first region:
initiating a timer;
subsequent to initiating the timer, periodically comparing the location information with an updated location of the UE to determine whether the updated location of the UE is within the first region;
displaying the emergency message on the display of the UE based on a determination that the updated location of the UE is within the first region; and
discarding the emergency message based on a determination that the timer has expired without determining that the updated location of the UE is within the first region.

10. The method of claim 8,
wherein the network entity is an evolved packet data gateway (ePDG); and
wherein the indication that the UE supports receiving emergency messaging is included within an internet key exchange version 2 (IKEv2) informational request.

11. The method of claim 9,
wherein the network entity is an internet protocol multimedia subsystem (IMS) application server;
wherein the indication that the UE supports receiving emergency messaging is included within a session initiation protocol (SIP) subscribe request; and
wherein the emergency message and the location information are included within a session initiation protocol (SIP) notify request.

12. The method of claim 8,
wherein the network entity is an access and mobility management function (AMF) server associated with a 5G radio access technology; and
wherein the indication that the UE supports receiving emergency messaging is included within a non-access stratum (NAS) registration request.

13. The method of claim 12,
wherein the UE communicates with the AMF server through a Non-3GPP InterWorking Function (N3IWF) network slice.

14. The method of claim 8,
wherein the wireless connection with the access point is established through one of:
a wireless local area network (WLAN);
a cellular network;
a satellite link; or
a peer-to-peer relay link.

15. A method for a network entity to communicate an emergency message to a user equipment device (UE), the method comprising:
receiving a notification from the UE indicating a capability of the UE to receive emergency messaging using a wireless local area network (WLAN) radio access technology (RAT);
receiving the emergency message and location information from an emergency messaging entity; and
transmitting the emergency message and the location information to the UE through the WLAN RAT based at least in part on receiving the notification from the UE.

16. The method of claim 15, the method further comprising:
determining an internet protocol (IP) address associated with the UE;
determining an approximate location associated with the IP address; and
determining whether the approximate location is within a region indicated by the location information,
wherein transmitting the emergency message and the location information to the UE through the WLAN RAT is further based at least in part on determining that the approximate location is within the region indicated by the location information.

17. The method of claim 15,
wherein the network entity is an evolved packet data gateway (ePDG); and
wherein the notification from the UE is included within an internet key exchange version 2 (IKEv2) informational request.

18. The method of claim 15,
wherein the network entity is an internet protocol multimedia subsystem (IMS) application server; and
wherein the notification from the UE is included within a session initiation protocol (SIP) subscribe request.

19. The method of claim 18,
wherein the SIP subscribe request is transmitted in association with a voice-over internet protocol (VoIP) call with the IMS application server.

20. The method of claim 15,
wherein the network entity is an access and mobility management function (AMF) server associated with a 5G radio access technology; and
wherein the notification from the UE is included within a non-access stratum (NAS) registration request.

* * * * *